US012244377B2

(12) United States Patent
Chivate et al.

(10) Patent No.: US 12,244,377 B2
(45) Date of Patent: Mar. 4, 2025

(54) COMPRESSION OF CHANNEL ESTIMATES

(71) Applicant: Parallel Wireless, Inc., Nashua, NH (US)

(72) Inventors: Praneet Chivate, Nashua, NH (US); Juwendo Denis, Boston, MA (US)

(73) Assignee: Parallel Wireless, Inc., Nashua, NH (US)

( * ) Notice: Subject to any disclaimer, the term of this patent is extended or adjusted under 35 U.S.C. 154(b) by 0 days.

(21) Appl. No.: 18/172,288

(22) Filed: Feb. 21, 2023

(65) Prior Publication Data

US 2023/0421217 A1 Dec. 28, 2023

Related U.S. Application Data

(60) Provisional application No. 63/268,701, filed on Feb. 28, 2022, provisional application No. 63/268,273, filed on Feb. 20, 2022.

(51) Int. Cl.
*H04B 7/06* (2006.01)
*H04L 5/00* (2006.01)

(52) U.S. Cl.
CPC ......... *H04B 7/0617* (2013.01); *H04L 5/0051* (2013.01)

(58) Field of Classification Search
CPC ............................. H04B 7/0617; H04L 5/0051
USPC .......................................................... 375/267
See application file for complete search history.

(56) References Cited

U.S. PATENT DOCUMENTS 10,588,038 B2    3/2020  Eitan et al.
2023/0043847 A1*  2/2023  Haustein ............ H04B 7/06966

OTHER PUBLICATIONS

"5G; NR; Physical channels and modulation" (3GPP TS 38.211 version 16.2.0 Release 16), Jul. 2020.
"5G; NR; Multiplexing and channel coding" (3GPP TS 38.212 version 16.2.0 Release 16), Jul. 2020.
"5G; NR; Physical layer procedures for control" (3GPP TS 38.213 version 16.2.0 Release 16), Jul. 2020.

* cited by examiner

*Primary Examiner* — Fitwi Y Hailegiorgis
(74) *Attorney, Agent, or Firm* — Michael Y. Saji

(57) ABSTRACT

In one embodiment, a method is disclosed for port reduction, comprising: calculating, at a distributed unit (DU), beamforming weights based on received DMRS channel estimates; sending the calculated beamforming weights to a radio unit (RU); applying, at the RU, port reduction to DMRS symbols based on the calculated beamforming weights; compressing IQ data and received DMRS symbol data to compensate for an underlying bandwidth increase, thereby enabling beamforming at the RU. PUSCH data may be compressed. Beamforming weight calculations may be performed in the O-DU. Beamforming weight calculations may be provided to the L2 scheduler. BFP format compression may be performed. Channel information may be compressed for non-signal data. DMRS compression may be performed at the CU. The DMRS pattern may be received from the control plane. An equalizer weight calculation may be performed to merge a plurality of CSI estimates from different RUs for a given user to calculate joint equalization. The method may further comprise applying, at the RU, port reduction to both PUSCH and DMRS symbols. Beamforming may be performed for uplink, for downlink, or both.

11 Claims, 8 Drawing Sheets

COMPRESSION OF CHANNEL ESTIMATES

CROSS-REFERENCE TO RELATED APPLICATIONS

The present application claims priority under 35 U.S.C. § 119(e) to U.S. Provisional Pat. App. No. 63/268,273, titled "Compression of Channel Estimates" and filed Feb. 20, 2022; and to U.S. Provisional Pat. App. No. 63/268,701, titled "Performance Enhancement of Option 7.2 Uplink" and filed Feb. 28, 2022, each of which are hereby incorporated by reference in their entirety for all purposes.

This application also hereby incorporates by reference, for all purposes, each of the following U.S. Patent Application Publications in their entirety: US20170013513A1; US20170026845A1; US20170055186A1; US20170070436A1; US20170077979A1; US20170019375A1; US20170111482A1; US20170048710A1; US20170127409A1; US20170064621A1; US20170202006A1; US20170238278A1; US20170171828A1; US20170181119A1; US20170273134A1; US20170272330A1; US20170208560A1; US20170288813A1; US20170295510A1; US20170303163A1; US20170257133A1; and US20200128414A1. This application also hereby incorporates by reference U.S. Pat. No. 8,879,416, "Heterogeneous Mesh Network and Multi-RAT Node Used Therein," filed May 8, 2013; U.S. Pat. No. 9,113,352, "Heterogeneous Self-Organizing Network for Access and Backhaul," filed Sep. 12, 2013; U.S. Pat. No. 8,867,418, "Methods of Incorporating an Ad Hoc Cellular Network Into a Fixed Cellular Network," filed Feb. 18, 2014; U.S. patent application Ser. No. 14/034,915, "Dynamic Multi-Access Wireless Network Virtualization," filed Sep. 24, 2013; U.S. patent application Ser. No. 14/289,821, "Method of Connecting Security Gateway to Mesh Network," filed May 29, 2014; U.S. patent application Ser. No. 14/500,989, "Adjusting Transmit Power Across a Network," filed Sep. 29, 2014; U.S. patent application Ser. No. 14/506,587, "Multicast and Broadcast Services Over a Mesh Network," filed Oct. 3, 2014; U.S. patent application Ser. No. 14/510,074, "Parameter Optimization and Event Prediction Based on Cell Heuristics," filed Oct. 8, 2014, U.S. patent application Ser. No. 14/642,544, "Federated X2 Gateway," filed Mar. 9, 2015, and U.S. patent application Ser. No. 14/936,267, "Self-Calibrating and Self-Adjusting Network," filed Nov. 9, 2015; U.S. patent application Ser. No. 15/607,425, "End-to-End Prioritization for Mobile Base Station," filed May 26, 2017; U.S. patent application Ser. No. 15/803,737, "Traffic Shaping and End-to-End Prioritization," filed Nov. 27, 2017, each in its entirety for all purposes, respectively. This document also hereby incorporates by reference U.S. Pat. Nos. 9,107,092, 8,867,418, and 9,232,547 in their entirety. This document also hereby incorporates by reference U.S. patent application Ser. No. 14/822,839, U.S. patent application Ser. No. 15/828,427, U.S. Pat. App. Pub. Nos. US20170273134A1, US20170127409A1 in their entirety. Features and characteristics of and pertaining to the systems and methods described in the present disclosure, including details of the multi-RAT nodes and the gateway described herein, are provided in the documents incorporated by reference.

BACKGROUND

5G NR Reference Signals. Reference signals are known signals that, upon being received at a receiver, are used to characterize a radio channel. Depending on the observed signal, the receiver may be able to determine whether a transmitter is moving, in what direction at what speed, whether there are many interferers, at a long distance, etc.

To increase protocol efficiency, and to keep transmissions contained within a slot or beam without having to depend on other slots and beams, NR introduces the following four main reference signals: Demodulation Reference Signal (DMRS); Phase Tracking Reference Signal (PTRS); Sounding Reference Signal (SRS); Channel State Information Reference Signal (CSI-RS).

DMRS is used to estimate the radio channel for demodulation. DMRS is UE specific and is only sent when necessary. Multiple orthogonal DMRS ports, one for each layer, can be scheduled for multiple-layer MIMO transmission.

Note that in 4G, there exists a Physical Uplink Shared Channel (PUSCH)/Physical Uplink Control Channel (PUCCH) DMRS. In 5G NR, an additional DMRS signal is sent on the downlink, from the base station unique to each UE. The present disclosure can be used for 4G as well as 5G/5GNR.

DMRS design and mapping is specific to each Downlink and Uplink NR channels, viz. NR-PBCH, NR-PDCCH, NR-PDSCH, NR-PUSCH, NR-PUSCH. DMRS is specific for specific UE and transmitted on demand. DMRS can be beamform the DMRS, kept within a scheduled resource, and transmit it only when necessary in either DL or UL. Multiple orthogonal DMRSs can be allocated to support MIMO transmission.

Further information is available in 3GPP TS 38.211, 38.212, 38.213, each hereby incorporated by reference in its entirety. Also incorporated by reference in its entirety is U.S. Prov. Pat. App. No. 63/268,273.

SUMMARY

In a first embodiment, a method is disclosed for port reduction, comprising: calculating, at a distributed unit (DU), beamforming weights based on received DMRS channel estimates; sending the calculated beamforming weights to a radio unit (RU); applying, at the RU, port reduction to DMRS symbols based on the calculated beamforming weights; compressing IQ data and received DMRS symbol data to compensate for an underlying bandwidth increase, thereby enabling beamforming at the RU.

PUSCH data may be compressed. Beamforming weight calculations may be performed in the O-DU. Beamforming weight calculations may be provided to the L2 scheduler. BFP format compression may be performed. Channel information may be compressed for non-signal data. DMRS compression may be performed at the CU. The DMRS pattern may be received from the control plane. An equalizer weight calculation may be performed to merge a plurality of CSI estimates from different RUs for a given user to calculate joint equalization. The method may further comprise applying, at the RU, port reduction to both PUSCH and DMRS symbols; Beamforming may be performed for uplink, for downlink, or both.

DETAILED DESCRIPTION

Figure 1:
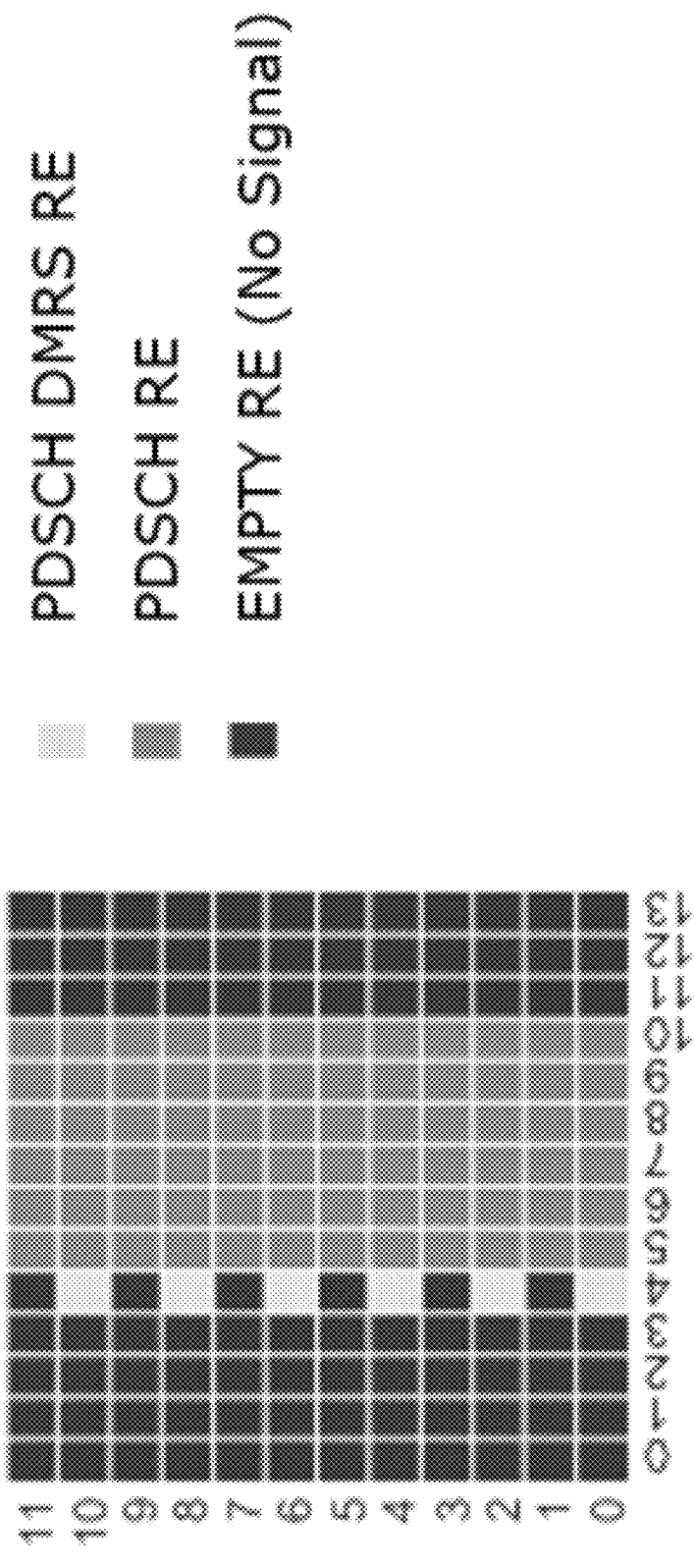
FIG. 1 is a schematic drawing of PDSCH DMRS and PDSCH resource elements, in accordance with some embodiments.

FIG. 1 is a schematic drawing of PDSCH DMRS and PDSCH resource elements, in accordance with some embodiments. The PDSCH DMRS 101 is broadcast to all user equipments and provides essential timing information that allows UEs to appropriately share the radio signal. The PDSCH DMRS RE is a small portion of the available spectrum broadcast at a specified timeslot that allows UEs to understand what portion of the spectrum is available for downlink or uplink use.

Radio Unit Functional Splits

5G New Radio (NR) was designed to allow for disaggregating the baseband unit (BBU) by breaking off functions beyond the Radio Unit (RU) into Distributed Units (DUs) and Centralized Units (CUs), which is called a functional split architecture.

Figure 2:
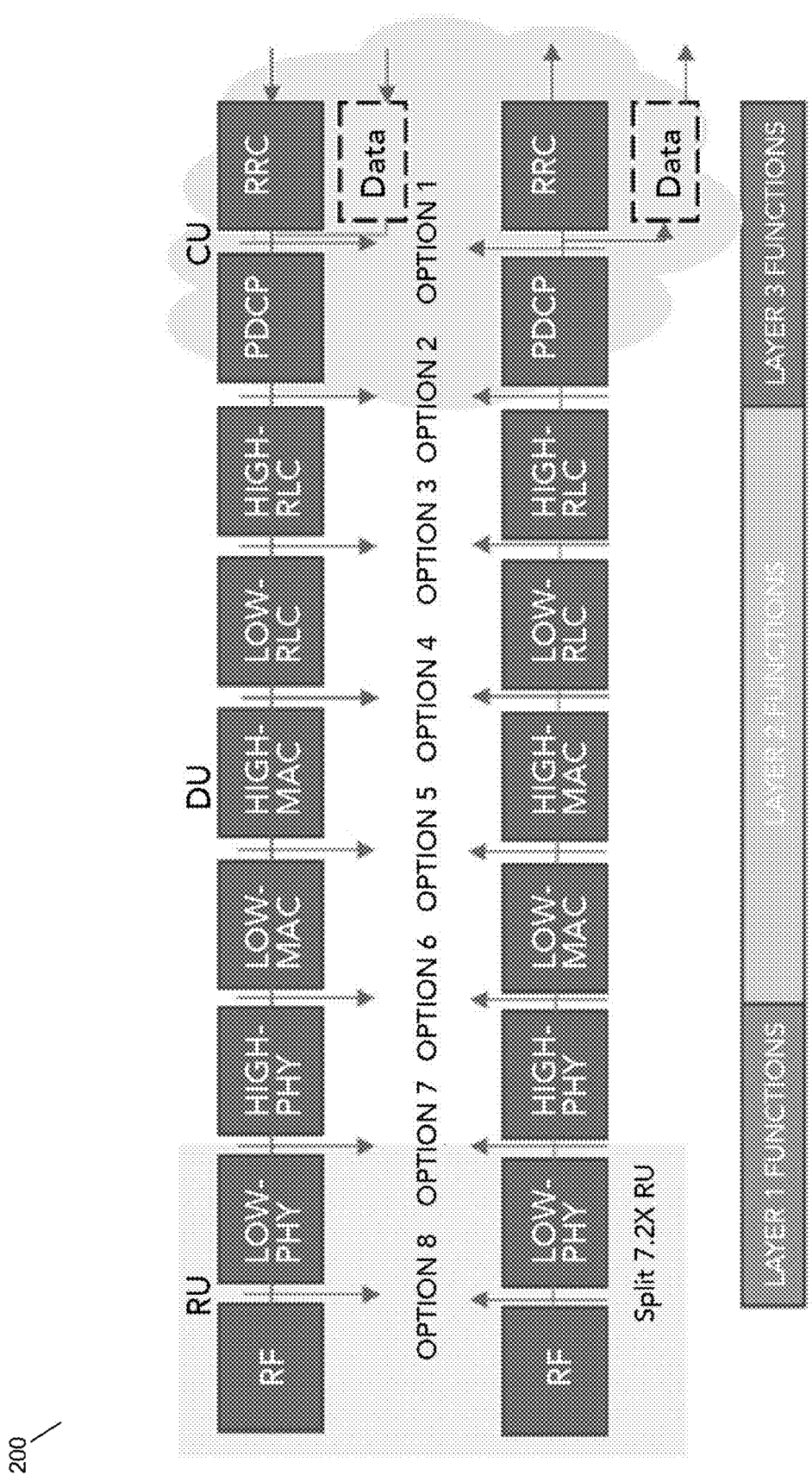
FIG. 2 is a schematic diagram of radio functional splits, in accordance with some embodiments.

FIG. 2 shows a schematic diagram of radio functional splits showing split 7.2X RU as well as other splits.

RU: This is the radio hardware unit that coverts radio signals sent to and from the antenna into a digital signal for transmission over packet networks. It handles the digital front end (DFE) and the lower PHY layer, as well as the digital beamforming functionality. 5G RU designs are supposed to be inherently intelligent, but the key considerations of RU design are size, weight, and power consumption. Deployed on site.

DU: The distributed unit software that is deployed on site on a COTS server. DU software is normally deployed close to the RU on site and it runs the RLC, MAC, and parts of the PHY layer. This logical node includes a subset of the eNodeB (eNB)/gNodeB (gNB) functions, depending on the functional split option, and its operation is controlled by the CU.

CU: The centralized unit software that runs the Radio Resource Control (RRC) and Packet Data Convergence Protocol (PDCP) layers. The gNB consists of a CU and one DU connected to the CU via Fs-C and Fs-U interfaces for CP and UP respectively. A CU with multiple DUs will support multiple gNBs. The split architecture lets a 5G network utilize different distributions of protocol stacks between CU and DUs depending on midhaul availability and network design. It is a logical node that includes the gNB functions like transfer of user data, mobility control, RAN sharing (MORAN), positioning, session management etc., except for functions that are allocated exclusively to the DU. The CU controls the operation of several DUs over the midhaul interface. CU software can be co-located with DU software on the same server on site.

Figure 4:
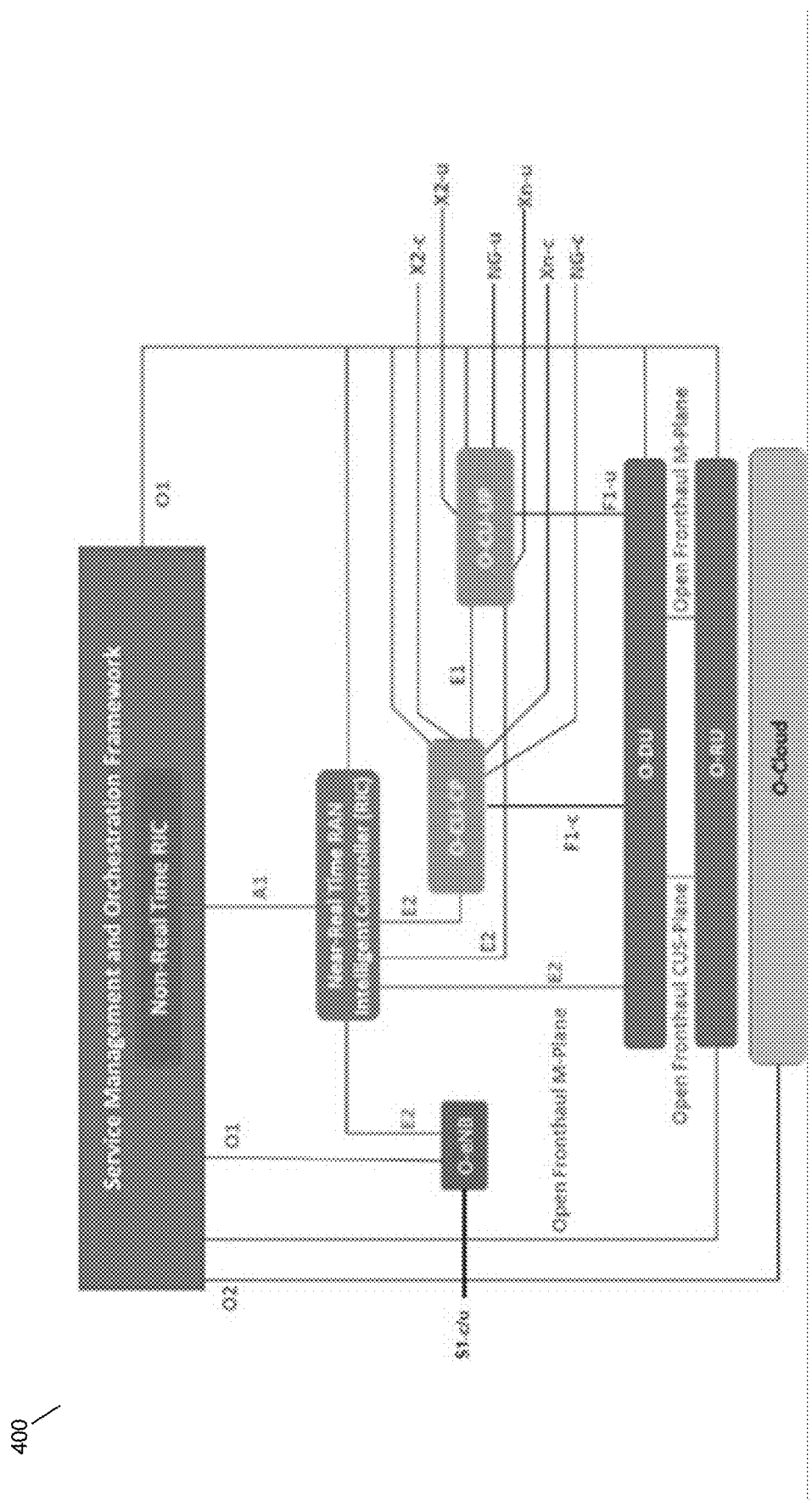
FIG. 4 is a schematic diagram of an O-RAN compatible network architecture, in accordance with some embodiments.

Because the RAN functional split architecture (FIG. 4) is fully virtualized, CU and DU functions runs as virtual software functions on standard commercial off-the-shelf (COTS) hardware and be deployed in any RAN tiered datacenter.

Option 7.2 (shown) is the functional split chosen by the O-RAN Alliance. It is a low-level split for ultra-reliable low-latency communication (URLLC) and near-edge deployment. RU and DU are connected by the eCPRI interface with a latency of ~100 microseconds. In O-RAN terminology, RU is denoted as O-RU and DU is denoted as O-DU. Further information is available in US20200128414A1, hereby incorporated by reference in its entirety.

Problem Statement

In the current 7.2x split in the UL, both DMRS-based channel estimation and SRS-based channel estimation occur at the O-DU. The O-DU then feeds back the SRS-based channel estimates, and/or beamforming calculated therefrom, which the O-RU leverages for the purpose of port reduction. However, SRS-based channel estimates become quickly outdated in severe interference or fast user mobility scenario. Using outdated SRS-based CSI at the O-RU will lead to overall system performance degradation.

This issue can be circumvented by performing ORU port reduction exploiting the DMRS-based channel estimates, and/or by considering beamforming weights which are calculated using DMRS-based channel estimates, which occur more frequently.

First Embodiment

The DMRS-based channel estimates are evaluated at the O-RU which has to transmit these estimates to the DU for the purpose of advanced channel equalization and joint decoding. which occur at the O-DU via the fronthaul interface. The transmission of the CSI estimates will add additional strain in terms of bandwidth requirement on the fronthaul interface. In fact, these estimates are complex values 16 bits I and 16 bits Q derived on a per resource element for every OFDM symbol every slot. The bitrate requirement can be evaluated as follow:

$$NumLayer*NumRBs*NumSubcarrersPerRB*NumSymbolsPerslot*IQWordSize*2*NumSlotsInSecond$$

Example. Consider the following parameters: Number of layers assumed=8; Number of RBs=273; Number of Sub-carriers=12; Number of Symbols per slot=14; IQ word Size: assuming 16 Bits word length. With these parameters, the corresponding bitrate is given by: 8*273*12*1*16*2*1000=11.75 Gbps To remedy this issue, we propose to compress the channel estimates with BFP format in order to reduce the overall fronthaul bitrate requirements. From the aforementioned example, the BFP-8 format would reduce the bandwidth requirement to 8*273*12*1*8*2*1000=5.8 Gbps.

Figure 3A:
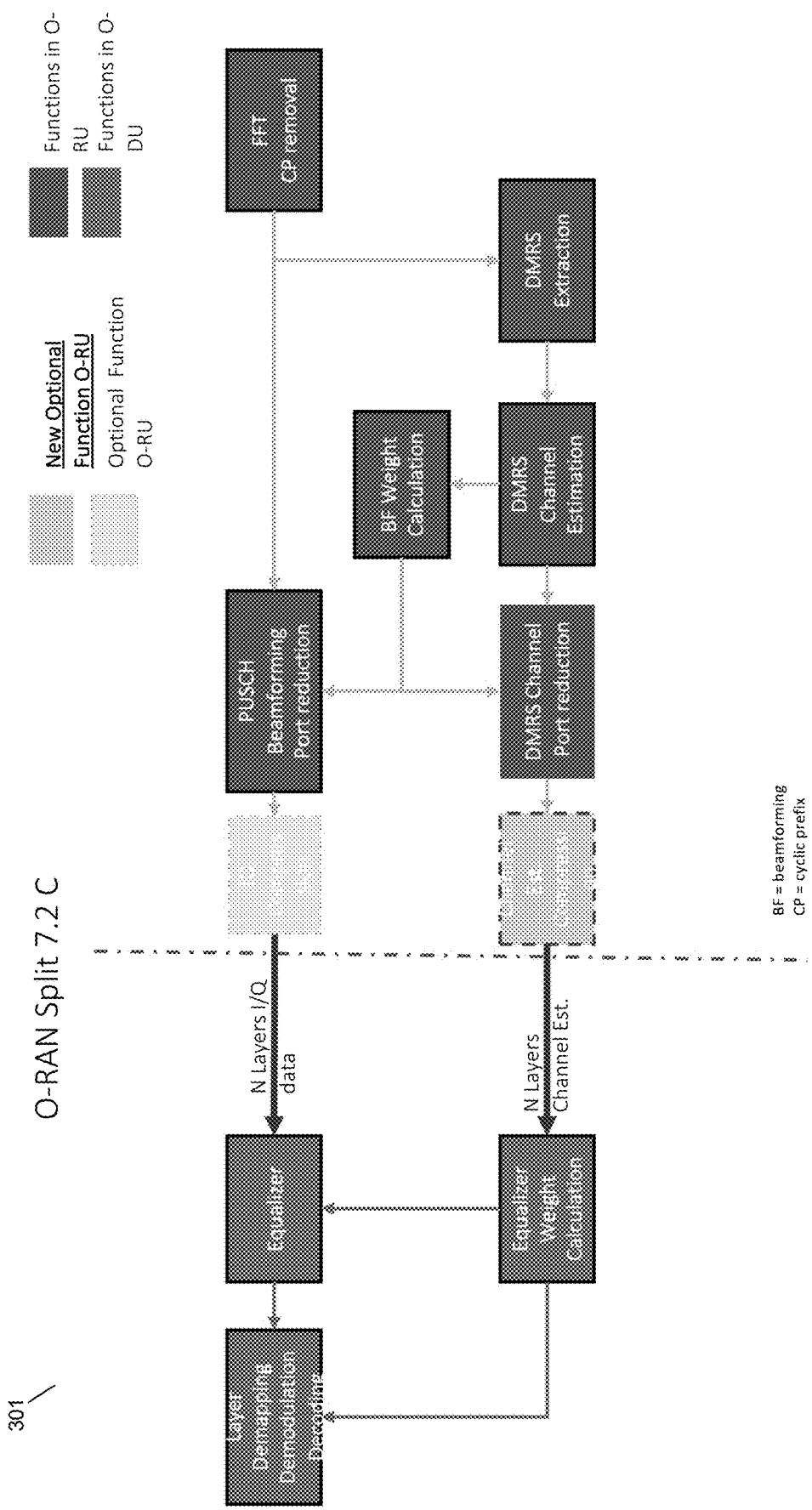
FIG. 3A is a first architectural schematic, in accordance with some embodiments.

FIG. 3A shows a first architectural schematic 301, in accordance with some embodiments. Rather than transfer channel estimates across the O-RAN Split boundary, in the present embodiment a new module is added to perform channel estimate compression at the O-RU, and another module added to perform IQ compression after PUSCH beamforming port reduction. These modules are present at the O-RU, which is unencumbered by battery and power envelope constraints. This results in appropriately compressed N layers of UQ data for I/Q compression, which in turn lowers the cost to implement these technologies at the radio head and at the cell site.

Second Embodiment

Additionally, given that ODU needs the raw DRMS symbols to estimate the channels, our solution is for the ORU to the transmit via the fronthaul interface the raw DMRS symbols to the ODU. For massive multiple-input-multiple-output (MIMO) the number of received antenna at the O-RU may be very large, the number of raw DMRS symbols may be prohibitive which will require additional bandwidth increase for the transmission on the fronthaul interface.

To remedy this issue, a solution of two parts is considered. Firstly, only a selected number of received antennas raw DRMS are transmitted from the O-RU to the O-DU via the fronthaul interface. The O-DU will convey via c-plane messages to the O-RU the antenna's indices which DMRS need to be transmitted over the fronthaul interface. This may be performed simply in the case that some IQ signals have 0 signal, in which case those IQ signals can be omitted. Secondly, this further alleviates the fronthaul bitrate requirement we propose to leverage BFP compression technique to compress the raw DMRS before transmission on the fronthaul interface.

Accordingly, another proposal for functional division, at roughly Option 7.2C, may be used. The O-RU leverages the selected DMRS-channel estimates based beamforming weight for port reduction. Port reduction is applied to both PUSCH and DMRS symbols. Optionally, the O-RU may compress the IQ data as well as the received DMRS symbols to compensate the underlying bandwidth increase. The O-DU can leverage the selected DMRS-based channel estimation to compute beamforming weight which is then sent to the O-RU for port reduction.

At the ORU, the ORU has a number of RX antennas, which may be a large array of antennas and which may be suitable for MIMO or M-MIMO, and which may be TRX antennas. However, sending channel estimation or DMRS information for a large array of antennas creates a data volume that is proportional to the number of antennas, which quickly reaches an unmanageable level. Therefore the approach is to select a subset of the antennas in the array and to indicate by the DU via a control plane difference. Any subset may be selected, in some embodiments, including based on DMRS measurements to certain antennas. Computing the channel estimation first may be performed, in some embodiments.

After extraction, the following block expands the measurement. For example, if the DMRS data are 6 per resource block, that is expanded to 72. Based on how you want to extrapolate DMRS for each and every RE. (Each RB is 12 subcarriers.

Figure 3B:
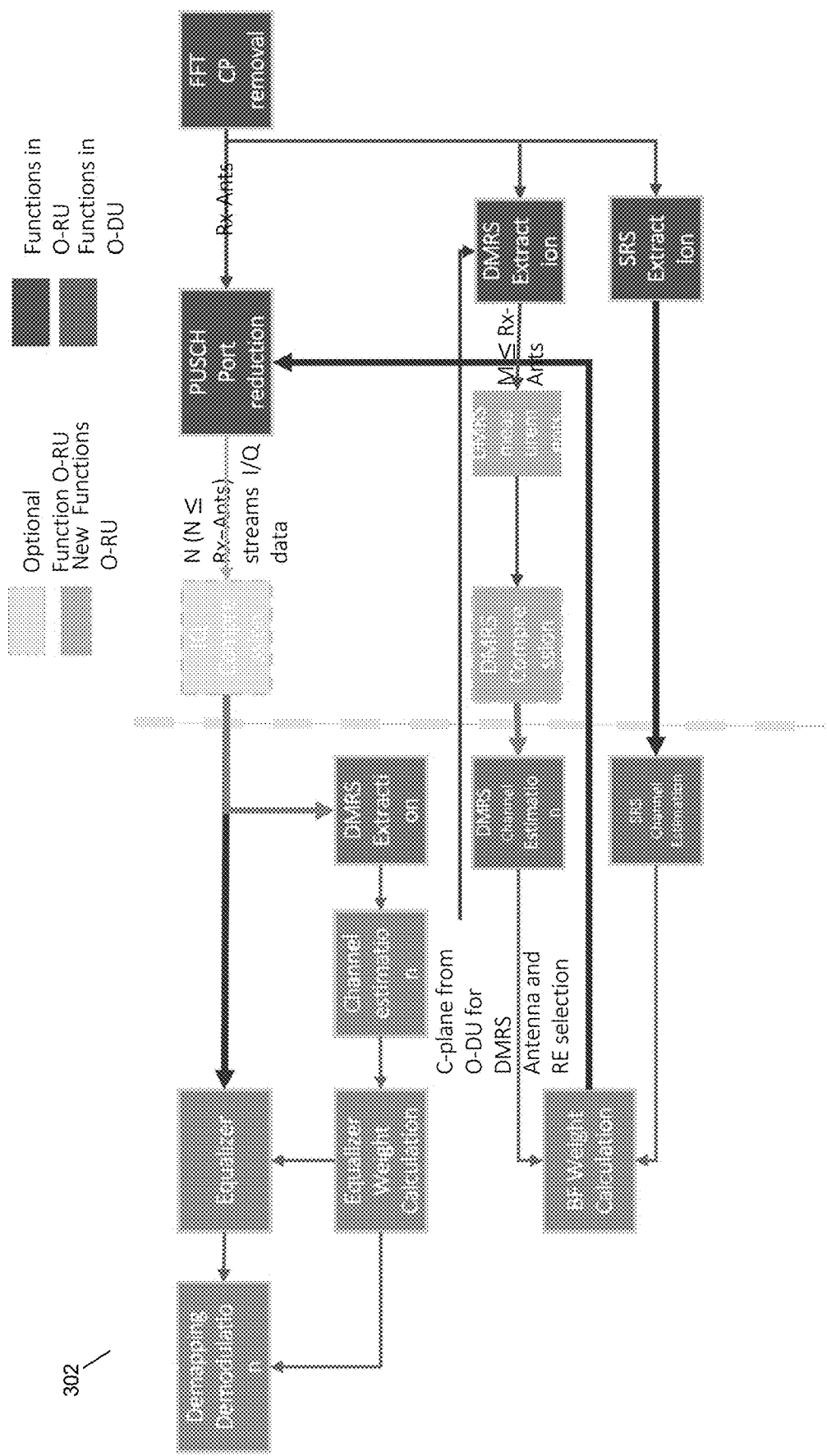
FIG. 3B is a second architectural schematic, in accordance with some embodiments.

FIG. 3B is a schematic diagram of 302, in accordance with some embodiments. Similar to FIG. 3A, several functions "move" right of the line, namely, IQ compression after PUSCH; DMRS compression; and DMRS measurements. DMRS channel estimation can be performed at the DU because the DMRS compression module ensures that reduced data is sent to the DU for channel estimation.

When you extract DMRS, that's proportional to the number of antennas and number of layers. Suppose 64 ANT. Then sending 64 ANT over FH interface, which requires impractically large bandwidth. However, in some embodiments, instead of sending 64 RX antenna signals, we choose a subset of those signals. The subset is chosen at the O-RU, however the way the subset is chosen is indicated by the O-DU via C-plane message.

Also, DMRS measurements can be sent along instead of the DMRS signals themselves. This saves required fronthaul resource.

The RX antennas selected may be whichever are useful in establishing beamforming weights.

After DRMS extraction, the following block expands the measurement. For example, if the DMRS data are 6 per resource block, that is expanded to 72 by extrapolating DMRS for each and every RE, given when each RB is 12 subcarriers.

This is true for both PDSCH and PUSCH DMRS. In this case we are discussing PUSCH. In some embodiments other DMRS is contemplated to be compressed in this way.

Note that it is further advantageous to perform beamforming weight calculation in the O-DU itself. L2 scheduler-determined weight scheduler is the right way to improve the process, and the L2 scheduler is in the ODU.

Description of Functions Used in Split 7-2x Uplink

Port reduction: linear transformation aiming at reducing the dimensionality from M received antennas to N layers Equalizer weight calculation: this block merges the CSI estimates from different O-RUs for a given user to compute the weight for the purpose of joint equalization, in some embodiments.

Equalizer: jointly process the incoming signals from different O-RU for a given user by leveraging the equalizer weight Channel estimate compression/DMRS compression: to optimize energy consumption at the O-RU, the compression block downsizes the channel estimates, and/or palliates the effect of bandwidth increase, before transmission on the fronthaul interface. In some embodiments PUSCH data may be compressed.

In some embodiments, the DMRS pattern is received from the control plane. In some embodiments, DMRS compression is performed at the CU. In some embodiments, beamforming weight calculations may be performed in the O-DU. In some embodiments, beamforming weight calculations may be provided to the L2 scheduler.

In some embodiments, channel information may be compressed for, e.g., non-signal data. In some embodiments, BFP format compression may be performed. US20110099295A1 (Wegener) is hereby incorporated by reference in its entirety and discloses block floating point (BFP) compression of signal data.

Additional Embodiments

Channel measurements may include the following, in some embodiments. After extraction, the following block expands the measurement. For example, if the DMRS data are 6 per resource block, that is expanded to 72. Based on how you want to extrapolate DMRS for each and every RE. (Each RB is 12 subcarriers. In the resource block there are 12 REs. If you are sending these there are only 12 IQs that are nonzero. This is true for both PDSCH and PUSCH DMRS and this disclosure is appropriate for either or both. O-DU will indicate, prior to the transmission. C-plane from O-DU for DMRS ANT and RE selection, in some embodiments.

Both 4G and 5GNR may be supported by the present invention, as they both use DMRS and support an Option 7.2 functional split.

Other channel estimates and reference signals may also be supported.

Although block floating point (BFP) compression is specifically identified, block scalar compression, multiplication compression, or other compression methods could be supported. Further detail regarding BFP compression may be found in US20110099295A1, hereby incorporated by reference in its entirety.

BFP with a predefined word length may be used.

The present disclosure could be used for any DU-RU functional split that shares channel estimates, such as O-RAN Category C.

The preceding block diagram shows the compression block in a particular position; however, various positions are able to be considered as long as they are on the RU side of the fronthaul split.

Compression of channel estimates could also be performed in either direction of the fronthaul split using the same method.

Where compression is used, decompression is also used on the other side of the fronthaul split.

DMRS compression is contemplated to be used in some embodiments; in other embodiments, DMRS channel estimate compression is used.

In some embodiments, a method is disclosed wherein we: extract DMRS; send DMRS measurements to DU; DU will combine and come up with beamforming weights; these are applied for this port reduction. In some embodiments, this architecture may be used for uplink beamforming or also for downlink beamforming.

Figure 5:
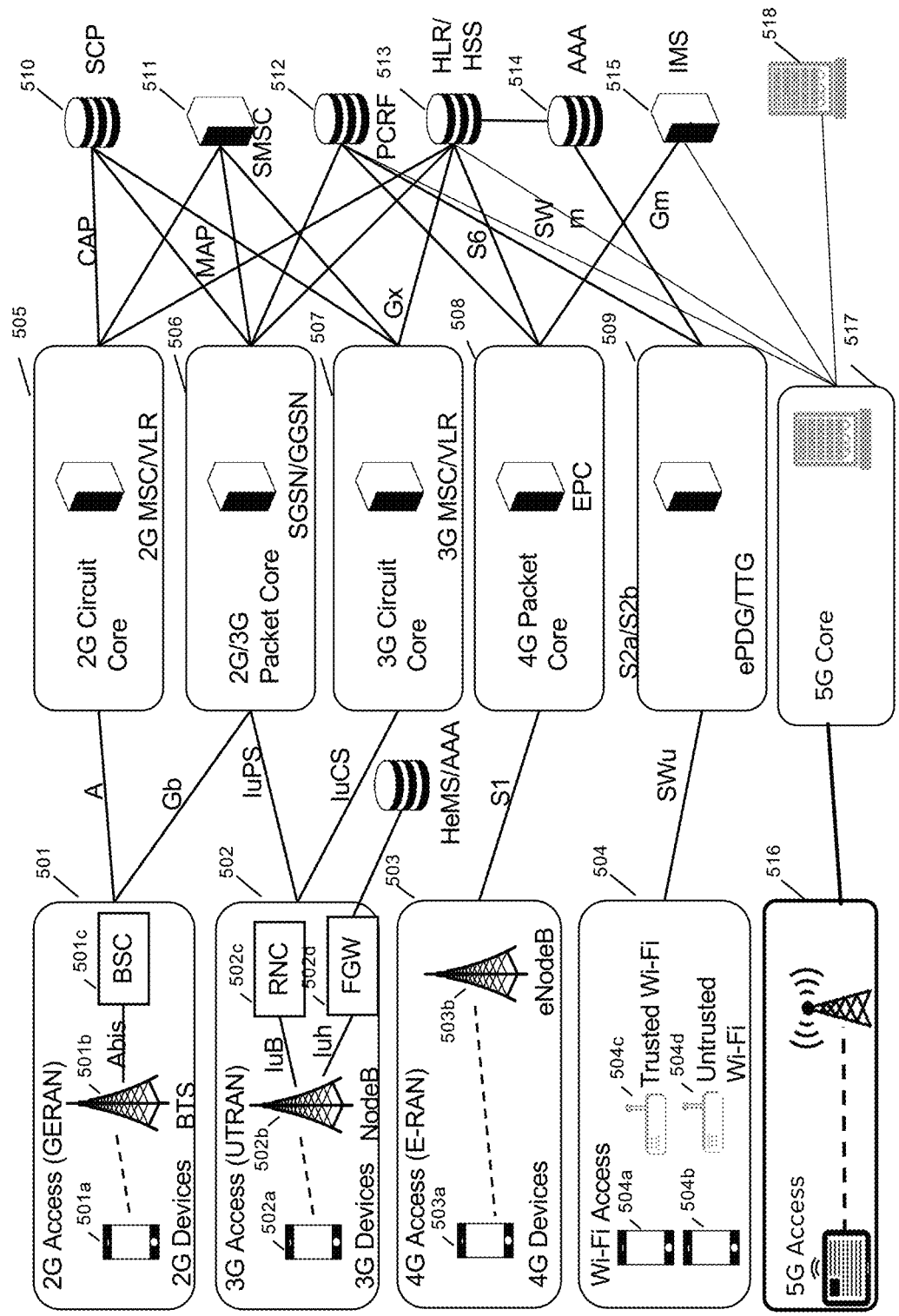
FIG. 5 is a schematic network architecture diagram for 4G and other-G networks, in accordance with some embodiments.

FIG. 5 is a schematic network architecture diagram for 3G and other-G networks, in accordance with some embodiments. The diagram shows a plurality of "Gs," including 2G, 3G, 4G, 5G and Wi-Fi. 2G is represented by GERAN 501, which includes a 2G device 501a, BTS 501b, and BSC 501c. 3G is represented by UTRAN 502, which includes a 3G UE 502a, nodeB 502b, RNC 502c, and femto gateway (FGW, which in 3GPP namespace is also known as a Home nodeB Gateway or HNBGW) 502d. 4G is represented by EUTRAN or E-RAN 503, which includes an LTE UE 503a and LTE eNodeB 503b. Wi-Fi is represented by Wi-Fi access network 504, which includes a trusted Wi-Fi access point 504c and an untrusted Wi-Fi access point 504d. The Wi-Fi devices 504a and 504b may access either AP 504c or 504d. In the current network architecture, each "G" has a core network. 2G circuit core network 505 includes a 2G MSC/VLR; 2G/3G packet core network 506 includes an SGSN/GGSN (for EDGE or UMTS packet traffic); 3G circuit core 507 includes a 3G MSC/VLR; 4G circuit core 508 includes an evolved packet core (EPC); and in some embodiments the Wi-Fi access network may be connected via an ePDG/TTG using S2a/S2b. Each of these nodes are connected via a number of different protocols and interfaces, as shown, to other, non-"G"-specific network nodes, such as the SCP 530, the SMSC 531, PCRF 532, HLR/HSS 533, Authentication, Authorization, and Accounting server (AAA) 534, and IP Multimedia Subsystem (IMS) 535. An HeMS/AAA 536 is present in some cases for use by the 3G UTRAN. The diagram is used to indicate schematically the basic functions of each network as known to one of skill in the art, and is not intended to be exhaustive. For example, 5G core 517 is shown using a single interface to 5G access 516, although in some cases 5G access can be supported using dual connectivity or via a non-standalone deployment architecture.

Noteworthy is that the RANs 501, 502, 503, 504 and 536 rely on specialized core networks 505, 506, 507, 508, 509, 537 but share essential management databases 530, 531, 532, 533, 534, 535, 538. More specifically, for the 2G GERAN, a BSC 501c is required for Abis compatibility with BTS 501b, while for the 3G UTRAN, an RNC 502c is required for Iub compatibility and an FGW 502d is required for Iuh compatibility. These core network functions are separate because each RAT uses different methods and techniques. On the right side of the diagram are disparate functions that are shared by each of the separate RAT core networks. These shared functions include, e.g., PCRF policy functions, AAA authentication functions, and the like. Letters on the lines indicate well-defined interfaces and protocols for communication between the identified nodes.

Figure 6:
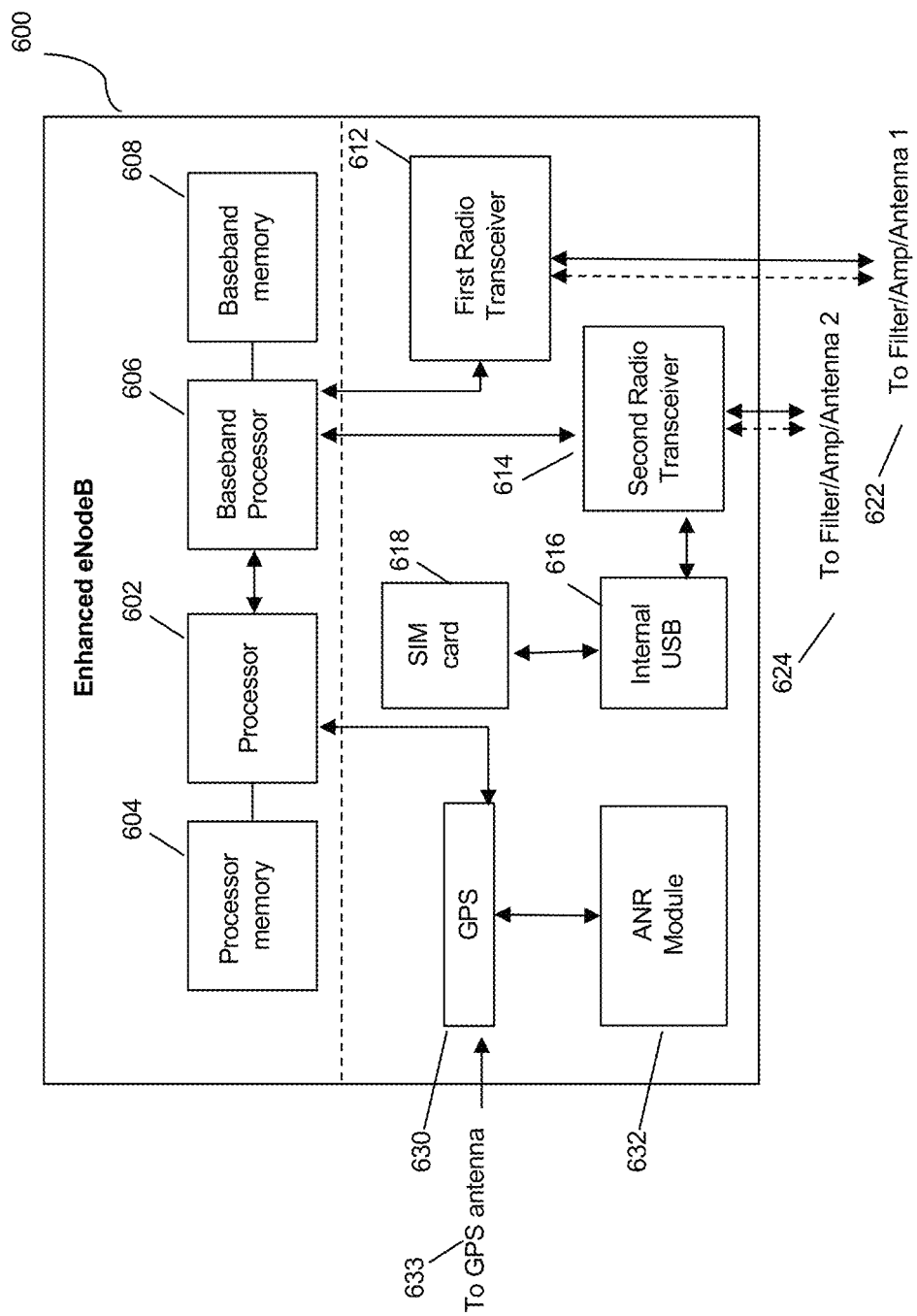
FIG. 6 is an enhanced eNodeB for performing the methods described herein, in accordance with some embodiments.

FIG. 6 is an enhanced eNodeB for performing the methods described herein, in accordance with some embodiments. Mesh network node 600 may include processor 602, processor memory 604 in communication with the processor, baseband processor 606, and baseband processor memory 608 in communication with the baseband processor. Mesh network node 600 may also include first radio transceiver 612 and second radio transceiver 614, internal universal serial bus (USB) port 616, and subscriber information module card (SIM card) 618 coupled to USB port 616. In some embodiments, the second radio transceiver 614 itself may be coupled to USB port 616, and communications from the baseband processor may be passed through USB port 616. The second radio transceiver may be used for wirelessly backhauling eNodeB 600.

Processor 602 and baseband processor 606 are in communication with one another. Processor 602 may perform routing functions, and may determine if/when a switch in network configuration is needed. Baseband processor 606 may generate and receive radio signals for both radio transceivers 612 and 614, based on instructions from processor 602. In some embodiments, processors 602 and 606 may be on the same physical logic board. In other embodiments, they may be on separate logic boards.

Processor 602 may identify the appropriate network configuration, and may perform routing of packets from one network interface to another accordingly. Processor 602 may use memory 604, in particular to store a routing table to be used for routing packets. Baseband processor 606 may perform operations to generate the radio frequency signals for transmission or retransmission by both transceivers 610 and 612. Baseband processor 606 may also perform operations to decode signals received by transceivers 612 and 614. Baseband processor 606 may use memory 608 to perform these tasks.

The first radio transceiver 612 may be a radio transceiver capable of providing LTE eNodeB functionality, and may be capable of higher power and multi-channel OFDMA. The second radio transceiver 614 may be a radio transceiver capable of providing LTE UE functionality. Both transceivers 612 and 614 may be capable of receiving and transmitting on one or more LTE bands. In some embodiments, either or both of transceivers 612 and 614 may be capable of providing both LTE eNodeB and LTE UE functionality. Transceiver 612 may be coupled to processor 602 via a Peripheral Component Interconnect-Express (PCI-E) bus, and/or via a daughtercard. As transceiver 614 is for providing LTE UE functionality, in effect emulating a user equipment, it may be connected via the same or different PCI-E bus, or by a USB bus, and may also be coupled to SIM card 618. First transceiver 612 may be coupled to first radio frequency (RF) chain (filter, amplifier, antenna) 622, and second transceiver 614 may be coupled to second RF chain (filter, amplifier, antenna) 624.

SIM card 618 may provide information required for authenticating the simulated UE to the evolved packet core (EPC). When no access to an operator EPC is available, a local EPC may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 600 is not an ordinary UE but instead is a special UE for providing backhaul to device 600.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 612 and 614, which may be Wi-Fi 802.11a/b/g/n/ac/ad/ah, Bluetooth, ZigBee, microwave (including line-of-sight microwave), or another wireless backhaul connection. Any of the wired and wireless connections described herein may be used flexibly for either access (providing a network connection to UEs) or backhaul (providing a mesh link or providing a link to a gateway or core network), according to identified network conditions and needs, and may be under the control of processor 602 for reconfiguration.

A GPS module 630 may also be included, and may be in communication with a GPS antenna 632 for providing GPS coordinates, as described herein. When mounted in a vehicle, the GPS antenna may be located on the exterior of the vehicle pointing upward, for receiving signals from overhead without being blocked by the bulk of the vehicle or the skin of the vehicle. Automatic neighbor relations (ANR) module 632 may also be present and may run on processor 602 or on another processor, or may be located within another device, according to the methods and procedures described herein.

Other elements and/or modules may also be included, such as a home eNodeB, a local gateway (LGW), a self-organizing network (SON) module, or another module. Additional radio amplifiers, radio transceivers and/or wired network connections may also be included.

Figure 7:
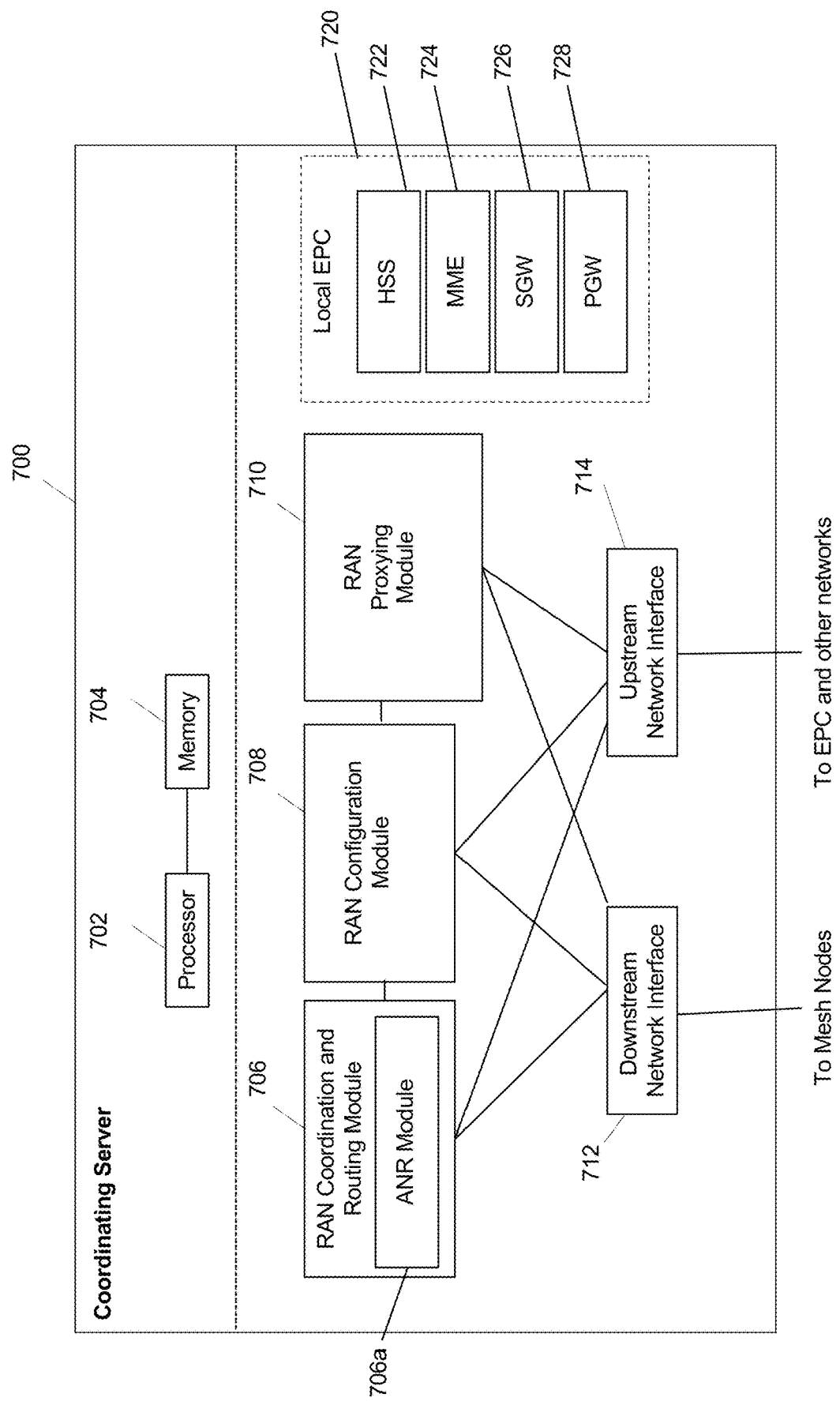
FIG. 7 is a coordinating server for providing services and performing methods as described herein, in accordance with some embodiments.

FIG. 7 is a coordinating server for providing services and performing methods as described herein, in accordance with some embodiments. Coordinating server 700 includes processor 702 and memory 704, which are configured to provide the functions described herein. Also present are radio access network coordination/routing (RAN Coordination and routing) module 706, including ANR module 706a, RAN configuration module 708, and RAN proxying module 710. The ANR module 706a may perform the ANR tracking, PCI disambiguation, ECGI requesting, and GPS coalescing and tracking as described herein, in coordination with RAN coordination module 706 (e.g., for requesting ECGIs, etc.). In some embodiments, coordinating server 700 may coordinate multiple RANs using coordination module 706. In some embodiments, coordination server may also provide proxying, routing virtualization and RAN virtualization, via modules 710 and 708. In some embodiments, a downstream network interface 712 is provided for interfacing with the RANs, which may be a radio interface (e.g., LTE), and an upstream network interface 714 is provided for interfacing with the core network, which may be either a radio interface (e.g., LTE) or a wired interface (e.g., Ethernet).

In some embodiments, coordinating server 700 includes local evolved packet core (EPC) module 720, for authenticating users, storing and caching priority profile information, and performing other EPC-dependent functions when no backhaul link is available. Local EPC 720 may include local HSS 722, local MME 724, local SGW 726, and local PGW 728, as well as other modules. Local EPC 720 may incorporate these modules as software modules, processes, or containers. Local EPC 720 may alternatively incorporate these modules as a small number of monolithic software processes. Modules 706, 708, 710 and local EPC 720 may each run on processor 702 or on another processor, or may be located within another device. In some embodiments, coordinating server 700 may also include a near-RT RIC, performing the functions described herein. In some embodiments, coordinating server 700 may also include a non-RT RIC, performing the functions described herein.

In 5GC, the function of the SGW is performed by the SMF and the function of the PGW is performed by the UPF. The inventors have contemplated the use of the disclosed invention in 5GC as well as 5G/NSA and 4G. As applied to 5G/NSA, certain embodiments of the present disclosure operate substantially the same as the embodiments described herein for 4G. As applied to 5GC, certain embodiments of the present disclosure operate substantially the same as the embodiments described herein for 4G, except by providing an N4 communication protocol between the SMF and UPF to provide the functions disclosed herein.

In any of the scenarios described herein, where processing may be performed at the cell, the processing may also be performed in coordination with a cloud coordination server. A mesh node may be an eNodeB. An eNodeB may be in communication with the cloud coordination server via an X2 protocol connection, or another connection. The eNodeB may perform inter-cell coordination via the cloud communication server when other cells are in communication with the cloud coordination server. The eNodeB may communicate with the cloud coordination server to determine whether the UE has the ability to support a handover to Wi-Fi, e.g., in a heterogeneous network.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, or in various orders as necessary.

Although the above systems and methods for providing interference mitigation are described in reference to the Long Term Evolution (LTE) standard, one of skill in the art would understand that these systems and methods could be adapted for use with other wireless standards or versions thereof.

The word "cell" is used herein to denote either the coverage area of any base station, or the base station itself, as appropriate and as would be understood by one having skill in the art. For purposes of the present disclosure, while actual PCIs and ECGIs have values that reflect the public land mobile networks (PLMNs) that the base stations are part of, the values are illustrative and do not reflect any PLMNs nor the actual structure of PCI and ECGI values.

In the above disclosure, it is noted that the terms PCI conflict, PCI confusion, and PCI ambiguity are used to refer to the same or similar concepts and situations, and should be understood to refer to substantially the same situation, in some embodiments. In the above disclosure, it is noted that PCI confusion detection refers to a concept separate from PCI disambiguation, and should be read separately in relation to some embodiments. Power level, as referred to above, may refer to RSSI, RSFP, or any other signal strength indication or parameter.

In some embodiments, the software needed for implementing the methods and procedures described herein may be implemented in a high level procedural or an object-oriented language such as C, C++, C#, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, other 3G/2G, 5G, legacy TDD, or other air interfaces used for mobile telephony. 5G core networks that are standalone or non-standalone have been considered by the inventors as supported by the present disclosure.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols including 5G, or other air interfaces.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, to 5G networks, or to networks for additional protocols that utilize radio frequency data transmission. Various components in the devices described herein may be added, removed, split across different devices, combined onto a single device, or substituted with those having the same or similar functionality.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment. Other embodiments are within the following claims.

The invention claimed is:

1. A method for port reduction, comprising:
   calculating, at a distributed unit (DU), beamforming weights based on received demodulation reference signal (DMRS) channel estimates;
   sending the calculated beamforming weights to a radio unit (RU);
   applying, at the RU, port reduction to DMRS symbols based on the calculated beamforming weights;
   compressing in-phase and quadrature (IQ) data and received DMRS symbol data to compensate for an underlying bandwidth increase,
   thereby enabling beamforming at the RU.

2. The method of claim 1, wherein physical uplink shared channel (PUSCH) data are compressed.

3. The method of claim 1, wherein beamforming weight calculations are performed in the DU.

4. The method of claim 1, wherein beamforming weight calculations are provided to a Layer 2 (L2) scheduler.

5. The method of claim 1, wherein block floating point compression is performed.

6. The method of claim 1, wherein channel information is compressed for non-signal data.

7. The method of claim 1, wherein DMRS compression is performed at a centralized unit (CU).

8. The method of claim 1, wherein the DMRS pattern is received from a control plane.

9. The method of claim 1, wherein an equalizer weight calculation is performed to merge a plurality of channel state information (CSI) estimates from different RUs for a given user to calculate joint equalization.

10. The method of claim 1, further comprising applying, at the RU, port reduction to both DMRS and physical uplink shared channel (PUSCH) symbols.

11. The method of claim 1, wherein beamforming is performed for uplink, for downlink, or both.

\* \* \* \* \*